Jan. 30, 1968 P. KONRAD 3,366,897

DELAY LINE FOR TRAVELLING WAVE TUBES

Filed Oct. 24, 1962 3 Sheets-Sheet 1

United States Patent Office 3,366,897
Patented Jan. 30, 1968

3,366,897

DELAY LINE FOR TRAVELLING WAVE TUBES

Pöbl Konrad, Munich, Germany, assignor to Siemens Aktiengesellschaft, a corporation of Germany Filed Oct. 24, 1962, Ser. No. 232,754
Claims priority, application Germany, Nov. 10, 1961, S 76,637
8 Claims. (Cl. 333—31)

The invention disclosed herein is concerned with a delay line for travelling wave tubes, comprising a helix which is disposed within an electrically conductive hollow body and having at least some of its turns rigidly connected with metallic supports which extend thereto from the wall of the hollow body.

The operation of a travelling wave tube requires a delay line with normal dispersion, that is, a delay line the fundamental wave of which is a forward wave. The dispersion shall be slight in a wide pass band. These requirements are to a high degree satisfied by a helical line. However, a disadvantage of such a line resides in that it is insufficiently thermally stable when used in connection with relatively high power tubes.

In order to overcome this drawback, it has been proposed to arrange a comb line in parallel to the helical line and to fasten at least some of the individual turns of the helical line rigidly to the free ends of the teeth of the comb line. In an embodiment of this known delay line, the back of the comb line forms part of an electrically conductive hollow body which also constitutes the vacuum envelope of the tube. The advantage of this known delay line resides in that the helical line is held in thermally stable manner due to the support thereof by the teeth of the comb line. However, the comb line exerts an unfavorable influence on the band width and on the dispersion course of the helical line.

The object of the present invention is, in view of the situation indicated above, to produce for travelling wave tubes a delay line for a forwardly propagated fundamental wave, such delay line providing for great band width and slight dispersion and being thermally stable and particularly adapted for use in connection with high power tubes.

This object is realized in connection with a delay line of the initially indicated kind, by the provision, within the hollow body, of metallic supports which are in longitudinal direction of the helical line progressively mutually angularly displaced.

The mutual angular displacement of the supports within the hollow body, as proposed by the invention, results in making the impedance connected in parallel to the helix considerably more high ohmic than is the case in known delay lines in which the metallic supports for the helix are successively arranged in alignment in one plane. The angular displacement of the metallic supports also renders the impedance referred to high ohmic throughout a wide frequency band. A delay line according to the invention therefore has, as compared with the indicated known delay line, a considerably greater band width.

A particular advantage of the invention resides in that it enables the construction of a delay line with the use of stacked or stapled metal sheet members, and producing a characteristic which corresponds substantially to that of a helical line.

Further details of the invention will appear from the description which is rendered below with reference to the accompanying drawings in which identical parts are similarly referenced.

Figure 1:
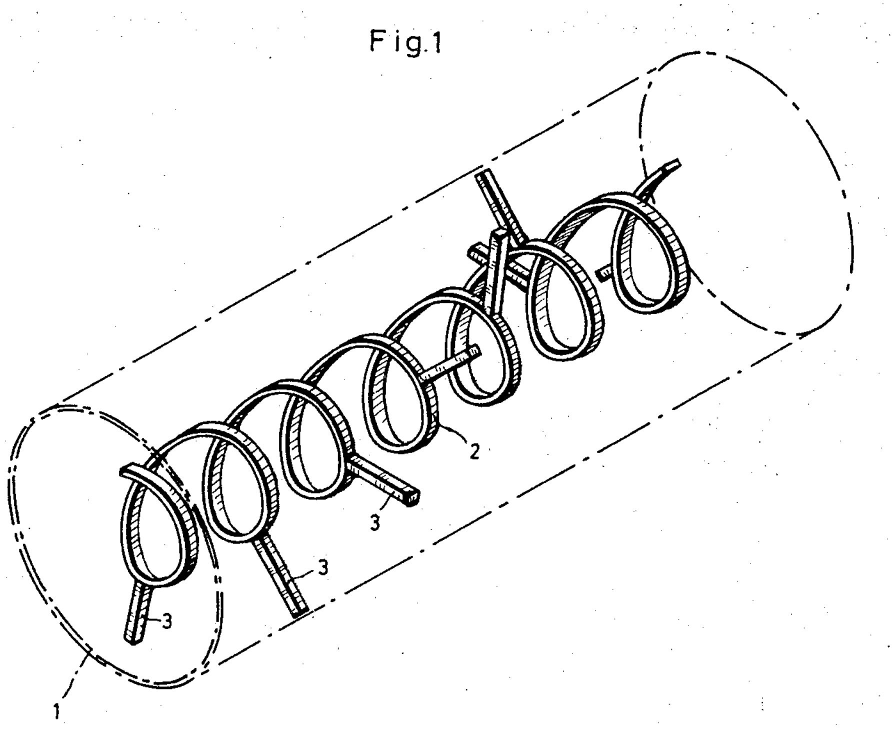
FIG. 1 shows in perspective view a delay line according to the invention.
Figure 2:
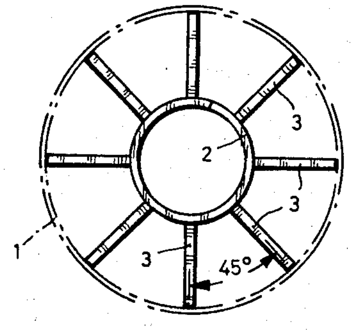
FIG. 2 is an end view of the delay line of FIG. 1.

Referring now to FIGS. 1 and 2, the helix is arranged within an electrically conductive cross-sectionally circular hollow body 1, coaxially therewith, and is rigidly or firmly fastened to metallic supports 3 which extend thereto from the wall of the hollow body which may also be briefly referred to as hollow conductor or wave guide. The metallic supports 3 are longitudinally of the helix successively mutually angularly displaced. In the illustrated example, the conductor of the helix 2, which may be made in the form of a flat band, is connected with a metallic support 3 always after a rotation of 315°. The helix 2 is thus supported or held always after a ⅞-turn thereof. The angle, deviating from 360°, which is embraced by mutually adjacent metallic supports (support angle), thus amounts to 45°.

The band width and dispersion of the delay line according to the invention depend upon the length of the supports and the support angle. The length of the supports (support length) shall be selected so that the metallic support is very high ohmic. The metallic support 3 shall accordingly operate as a $\lambda/4$ support.

It is to be observed thereby that the support length must be shorter than would correspond to the length $\lambda/4$, because the inclination of the metallic supports 3 within the hollow conductor 1, one with respect to the other, results in an auxiliary capacitance which requires a reduced $\lambda/4$ support. This capacitance increase operates also in the sense of a wide band transformation, such that the metallic supports 3 appear in a wide frequency band as $\lambda/4$-supports, that is, that they are sufficiently high ohmic. The capacitance increase is calculable from the support angle by integration over the support length.

The band width therefore depends upon the support angle and the support length. A very definite support angle will produce greatest band width for a given support length. Approximately similar band width may be obtained again by variation of the support length and the support angle. Reduction of the support length is equivalent to reduction of the inner diameter of the hollow conductor 2. It may be said, in general, that the support length which is effective in the vicinity of the $\pi$-resonance of the helix line as $\lambda/4$-support, provides with favorably selected support angle maximum band width for the delay line.

Figure 3:
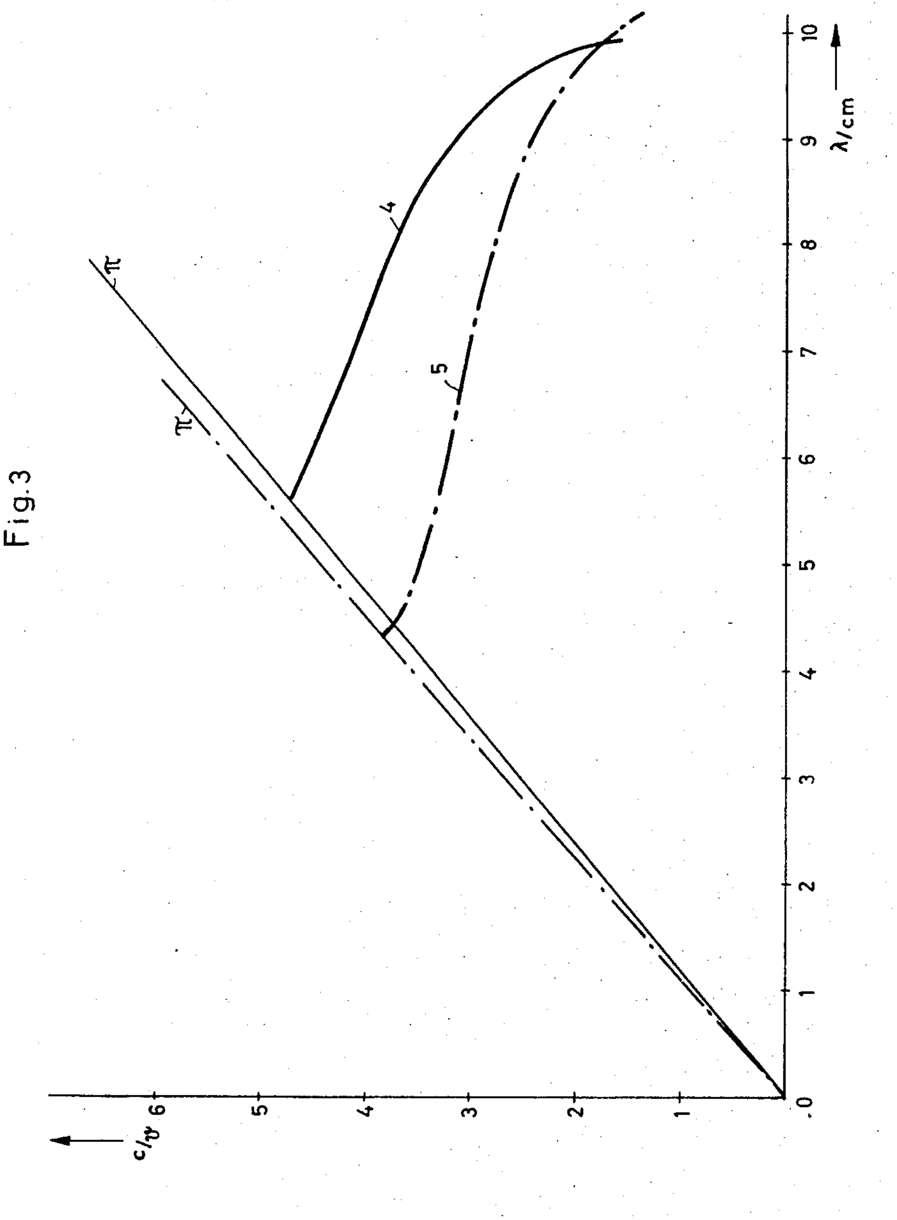
FIG. 3 shows the dispersion curves for two lines obtained for support angles of 45° and 60°, respectively.

Practical experiments have been conducted for support angles from 30° to 120°. FIG. 3 shows the dispersion curves which have thereby been obtained for two lines. The dispersion curve 4 corresponds to a delay line according to FIGS. 1 and 2, with a support angle of 45° while the dispersion curve 5 was obtained with a delay line having a support angle of 60° and reduced inner diameter of the hollow conductor 1. The amount of delay is in connection with a delay line according to the invention smaller than it would be in the case of a normal helical line, because the metallic supports reduce the coupling inductance of the helix. In order to obtain the same amount of delay as in the case of a normal helical line, it will therefore be necessary that the pitch of the helix of the delay line according to the invention be reduced as compared with the pitch of the helix of a normal helical line.

Figure 4:
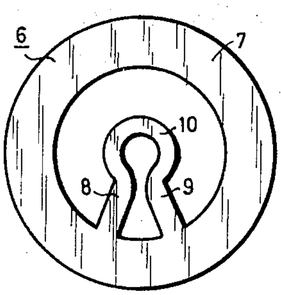
FIGS. 4, 5 and 6 show sheet metal members of two different configurations for use in constructing the delay line illustrated in FIGS. 1 and 2.
Figure 5:
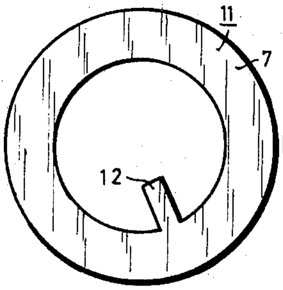
Figure 6:
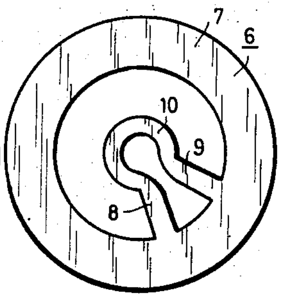

The delay line shown in FIGS. 1 and 2 can be advantageously constructed with the use of punched sheet metal members of two configurations as shown in FIGS. 4, 5 and 6. The sheet members of one shape, shown in FIGS. 4 and 6, represent the cross section 7 of the hollow conductor with two spars 8 and 9 and the part 10 of the helical conductor, which is disposed between two adjacent metal supports. The sheet member 11 of a second configuration, shown in FIG. 5, merely represents or forms the cross section 7 of the hollow conductor with a spar 12 extending radially into the hollow conductor. The sheet members 6 and 11 are in accordance with their respective positions corresponding to FIGS. 4, 5 and 6 alternately stapled or stacked so that a spar 9 of a sheet member 6 is always aligned with the spar 12 of a sheet member 11 and the spar 8 of the next following metal sheet member 6. The spars 9 will then form the forward front and the spars 8 the rearward front of a metallic support, while the spars 12 of the metal sheets 11 will represent the core pieces of the respective metal supports. The end surface of the spar 12 represents the part of the helical conductor which connects the respective partial elements together.

Figure 7:
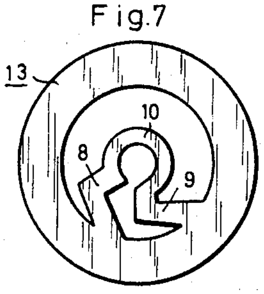
FIGS. 7, 8 and 9 show sheet metal members for use in constructing a delay line with reduced inner diameter of the hollow conductor.
Figure 8:
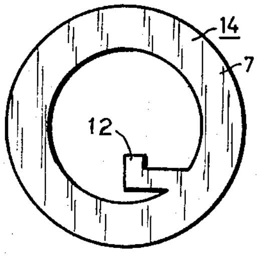
Figure 9:
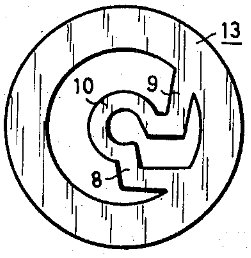

The inner diameter of the hollow conductor of a delay line according to the invention can be reduced without alteration of the operatively effective supporting length, by disposing the metal supports, as shown in FIGS. 7, 8 and 9, at an angle with respect to the inner wall of the hollow conductor. As will be seen from these figures, the delay line can again be constructed with the use of stacked metal sheet members 13 and 14 forming the angularly extending metallic supports. The metal sheet members 13 and 14 are for this purpose successively stacked according to the positions shown in FIGS. 7, 8 and 9, with the support angle successively mutually angularly displaced, until the desired length of the delay line is obtained. The sheet members 13 thereby form, in a similar manner as the metal sheet members 6 of FIGS. 4 and 6, the cross section 7 of the hollow conductor, with the forward front 9 and the rearward front 8 of two adjacent metal supports and the partial sections 10 of the helical conductor, while the metal sheet members 14 form the cross section 7 of the hollow conductor with the cores 12 of the respective metal supports.

Figure 10:
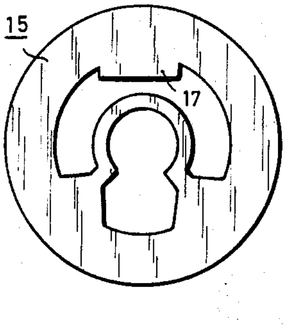
FIGS. 10 and 11 represent metal sheet members for use in constructing a delay line with enlarged roots of the metal supports so as to further improve the thermal stability thereof and forming means for broadening the dispersion curve of the delay line.
Figure 11:
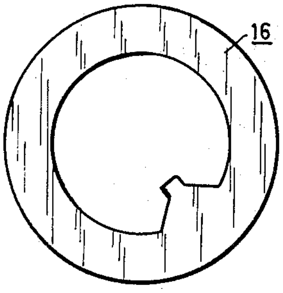

FIGS. 10 and 11 show metallic sheet members 15 and 16 for use in constructing a delay line according to the invention, wherein the roots of the metal supports are enlarged. The effect of this feature is that the thermal stability of the delay line is further improved. The meta sheet members 15 are moreover provided with extension 17 which project from the inner wall of the hollow conductor toward the helix so as to load the latter capacitively. The effect of the capacitive loading is that the zero resonance of the helix is shifted toward the longer waves, that is, the dispersion curve of the delay line is broadened.

Figures 12, 13:
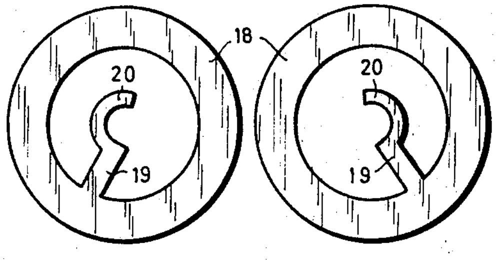
FIGS. 12 and 13 show metal sheet members of identical configuration, for use in constructing a delay line.

As indicated in FIGS. 12 and 13, the delay line may also be constructed with the use of metallic sheet members of identical configuration. These sheet members form the cross section 18 of the hollow conductor as well as the metal supports 19 and parts 20 of the helical conductor, the respective part 20 corresponding to somewhat more than half of the rotation angle of the helical conductor between two adjacent metal supports 19. The individual sheet metal members, represented in FIGS. 12 and 13, are stacked with alternately interchanged sides and successively angularly displaced respectively by support angles of, for example, 45°, 60°, 72° or 90°. The partial portions 20 of the helical conductor will then overlap by the angular amount by which they are extended with respect to half the rotation angle between two adjacent metal supports 19, resulting in a disk helix.

In delay lines constructed of punched metal sheet members according to FIGS. 4 to 11, one type of metal sheet member may be made of magnetic material and the other type may be made of non-magnetic material. The metal sheet members made of magnetic material may then be utilized as pole pieces for focusing the electron beam with periodic magnetic fields. The feature of angularly disposing the metal supports is in such case of particular interest, since it permits reduction of the diameter of the hollow conductor and therewith increase of the effectiveness of the periodical focusing.

The invention is not inherently limited to the illustrated embodiments. It is in particular possible to effect the capacitive loading of the example shown in FIGS. 10 and 11, by the sheet members 16 instead of by the sheet members 15. This is of advantage, particularly in the case of great supporting angles, so as to avoid mutual coupling of the metallic supports. Moreover, the metallic supports need not extend rectilinearly in the embodiments according to FIGS. 12 and 13, but may extend angularly so as to reduce the inner diameter of the hollow conductor. However, it is in such case necessary to use for the construction of the delay line two metal sheet members of different configuration, since the metal sheet members shown in FIGS. 12 and 13 will not be mirror-symmetrically similar upon placing the supports at an angle.

Changes may be made within the scope and spirit of the appended claims which define what is believed to be new and desired to have protected by Letters Patent.

I claim:

1. A delay line for a travelling wave tube, comprising a helix arranged within an electrically conductive hollow body of circular cross section, a plurality of metallic supports extending from the wall of said hollow body toward said helix and respectively firmly connected with at least some of the turns of said helix, said supports being longitudinally of the helix progressively mutually angularly displaced, with a plurality of metallic supports being connected with said helix respectively within the range of one full revolution thereof, and in which the angle, deviating from 360°, embraced by two mutually adjacent metallic supports, referred to as support angle, lies between 30° and 120°, the respective supports having an electrical length so as to provide a high ohmic input impedance in the range of the frequency which corresponds to the $\pi$—resonance of the helix.

2. A delay line according to claim 1, wherein the helical conductor is a flat metal band, the thickness of the respective metallic supports corresponding to the width of said band.

3. A delay line according to claim 1, comprising a plurality of stacked metal sheet members forming said helix and said supports.

4. A delay line according to claim 3, comprising two types of metal sheet members of different configuration one of said types defining the cross section of said hollow body with the forward front and the rearward front of two adjacent supports and also defining a part of the helical conductor disposed between such supports, and the other type defining the cross section of said hollow body and the core of a support, said two types of metal sheet members being alternately stacked with the forward front and the core and the rearward front of a support in alignment.

5. A delay line according to claim 3, comprising metal sheet members of identical configuration, defining respectively the cross section of said hollow body with one support and part of said helical conductor which corresponds to somewhat more than half of the rotation angle between two adjacent supports, said metal sheet members being stacked with opposite sides thereof in engagement so that the parts of said helical conductor mutually overlap by the angular amount by which they are extended with respect to the half rotation angle between two adjacent supports.

6. A delay line according to claim 4, comprising extensions formed on the metal sheet members of the first type and directed toward said helix.

7. A delay line according to claim 4, comprising extensions formed on the metal sheet members of the second type and directed toward said helix.

8. A delay line for a travelling wave tube, comprising a helix arranged within an electrically conductive hollow body of circular cross section, and means for supporting said helix within said body with as little as possible influence on the high-frequency characteristics of the helix, said supporting means comprising a plurality of metallic supports extending from the wall of said hollow body toward said helix, each of said supports being firmly connected with a respective turn of said helix, with a plurality of such metallic supports being connected with said helix respectively within the range of one full revolution thereof, each of said supports being angularly displaced with respect to the next support displacement being progressive with the angle embraced by two mutually adjacent supports, referred to as support angle, lying between 30° and 120° whereby the high-frequency characteristics of the helix are unaffected by such supports.

References Cited

UNITED STATES PATENTS

| | | | |
|---|---|---|---|
| 2,768,322 | 10/1956 | Fletcher | 315—3.5 |
| 2,926,280 | 2/1960 | Hergenrother | 315—3.6 |
| 2,939,035 | 5/1960 | Reverdin | 333—31 |
| 2,961,573 | 11/1960 | Dow | 315—3.6 |
| 2,971,114 | 2/1961 | Dow | 315—3.6 |
| 3,011,085 | 11/1961 | Caldwell | 315—3.5 |
| 3,099,767 | 9/1963 | Gross | 333—31 |
| 3,157,814 | 11/1964 | Gross | 315—3.5 |
| 3,201,720 | 8/1965 | Bradford et al. | 333—31 |

HERMAN KARL SAALBACH, *Primary Examiner.*

C. BARAFF, *Assistant Examiner.*